Aug. 14, 1945.           H. KING           2,382,013
WORK PIECE FEEDING MEANS FOR MACHINE TOOLS
Filed Oct. 30, 1941       4 Sheets-Sheet 1
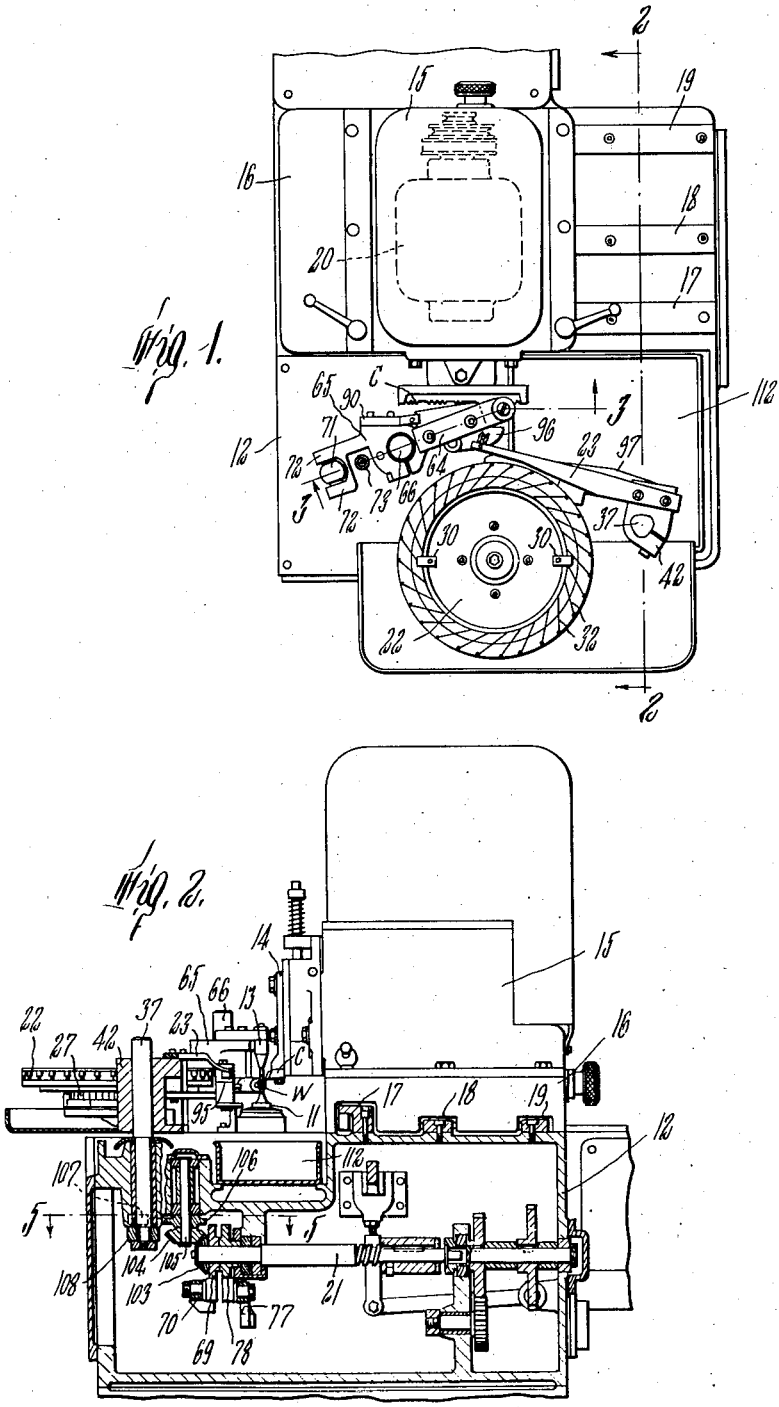
Inventor
Harry King

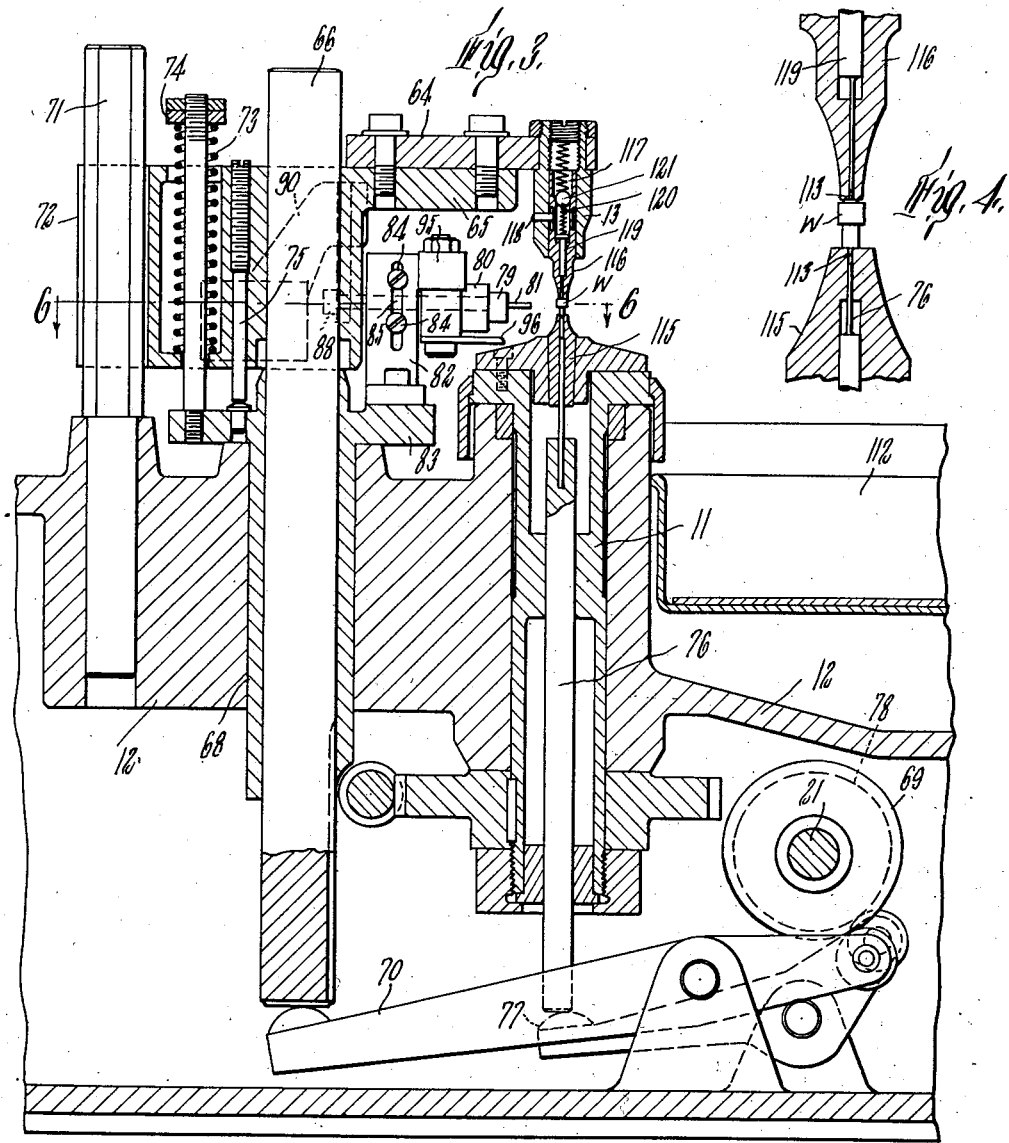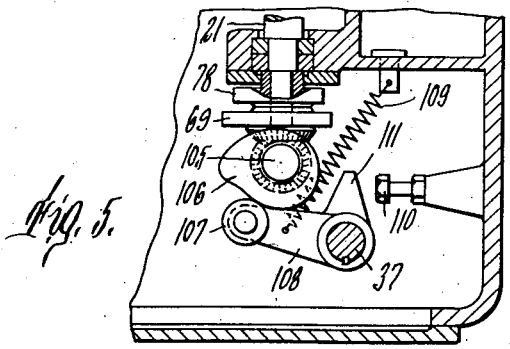

Aug. 14, 1945.    H. KING    2,382,013
WORK PIECE FEEDING MEANS FOR MACHINE TOOLS
Filed Oct. 30, 1941    4 Sheets-Sheet 3

Inventor
Harry King

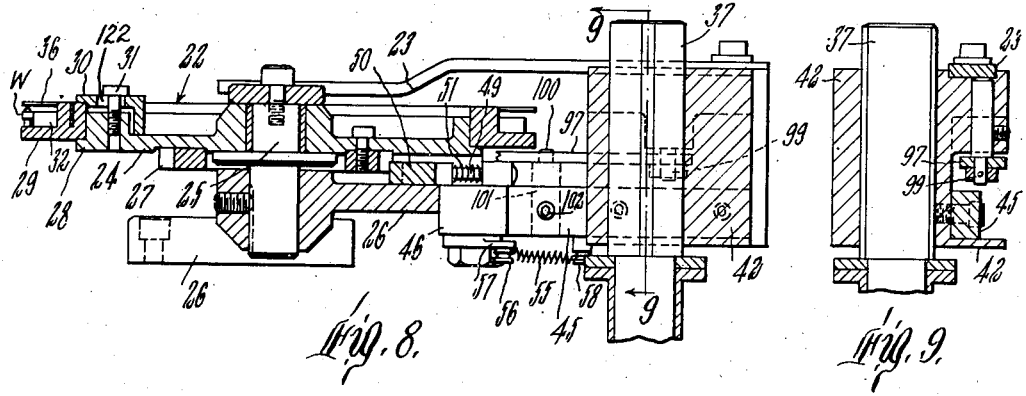
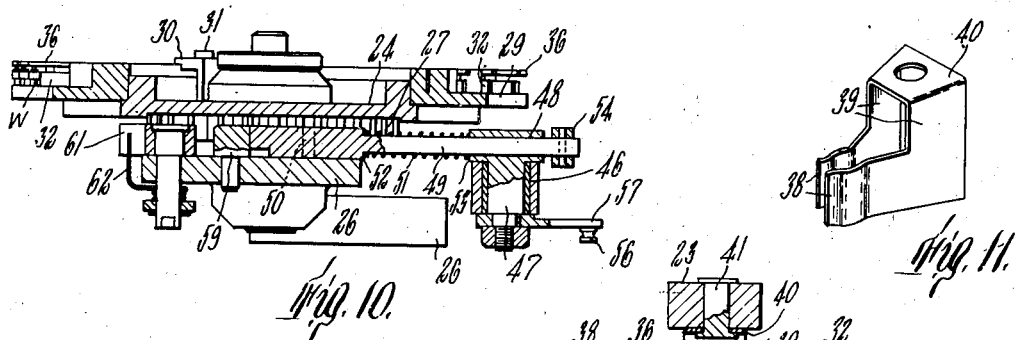
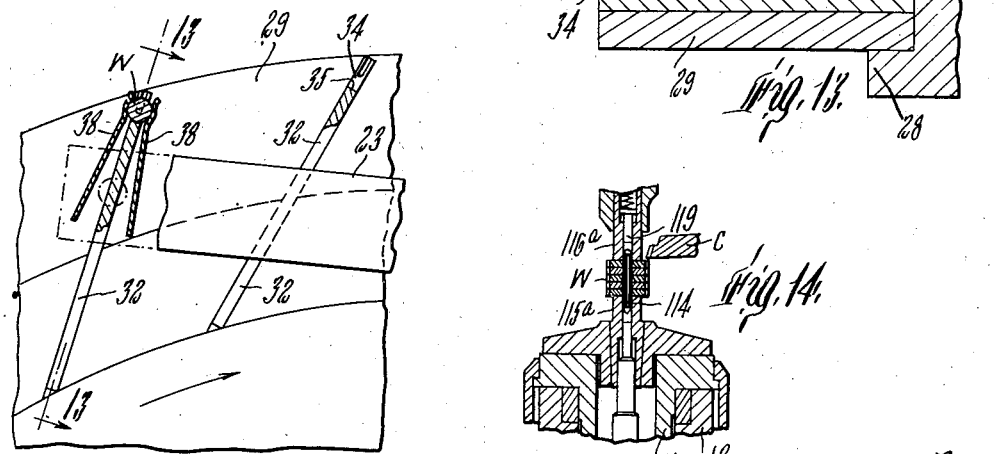

Patented Aug. 14, 1945

2,382,013

UNITED STATES PATENT OFFICE 2,382,013

WORKPIECE FEEDING MEANS FOR MACHINE TOOLS

Harry King, Springfield, Vt., assignor to The Fellows Gear Shaper Company, Springfield, Vt., a corporation of Vermont Application October 30, 1941, Serial No. 417,127

15 Claims. (Cl. 90—1)

The object of this invention is to provide, in cooperation with a machine tool, a magazine for holding a supply of work pieces and means for transferring such work pieces successively from the magazine to the work spindle or other work holder of the machine tool. An embodiment of the invention designed for feeding small gear and pinion blanks to the rotatable work spindle of a gear shaping machine, is here shown for illustration, and the following explanation of its principles and characteristics is based on that showing. The particular gear shaping machine referred to is provided with a rotating work spindle and a cutter having teeth with cutting edges on one end, arranged in a straight line, like the teeth of a rack, extending tangentially of a circle centered on the work spindle axis. Said cutter is reciprocated lengthwise of the work spindle, but transversely of its own length, for performing its cutting action and is, at the same time, progressively advanced endwise at a speed in harmony with the rotational speed of the work spindle such as to generate tooth forms in the work pieces conjugate to the edge outlines of its own teeth. The machine is capable of generating very small pinions and gears, such as those used in watches and scientific instruments, and is rapid in its action. An automatic feeder for substituting blanks in place of finished work pieces rapidly, and at the same time accurately, is particularly important in such a machine. However, the invention is not limited to that specific use and combination, but is applicable as well to other types of gear forming machine, and indeed to machine tools of many other types which are designed to take single blank pieces, or unit assemblages of blanks, and perform a machining operation on them.

The invention comprises in its main features a shiftable magazine having provisions for carrying a considerable number of blank pieces or units, transfer means for carrying such units from the magazine to the work holding instrumentalities of the machine tool, and means for correlating the progression of the magazine and the actions of the transfer means with the working cycle of the machine tool in such manner that the blank pieces will be brought to the working instrumentalities in the pauses between the end of each operating cycle and the commencement of the next cycle. It further comprises, as an optional feature, means for discharging finished pieces automatically immediately prior to the transfer of blank pieces into working position. All the particulars of one embodiment of the invention, together with an explanation of the principles thereof, are set forth in the following specification, with reference to illustrative drawings, to which attention is now directed.

In the drawings,

Fig. 1 is a plan view of a small-gear shaping machine having my novel work supplying means applied in cooperative combination with the gear generating instruments of the machine;

Fig. 2 is a vertical cross section of the machine taken on line 2—2 of Fig. 1;

Fig. 3 is a detail vertical section taken on line 3—3 of Fig. 1 and shown on much larger scale;

Fig. 4 is a fragmentary sectional view on a still larger scale of the work holding members of the shaping machine holding a pinion blank between them;

Fig. 5 is a fragmentary plan view and partial section taken on line 5—5 of Fig. 2;

Fig. 8 is a vertical section on line 8—8 of Fig. 6;

Fig. 9 is a detail section on line 9—9 of Fig. 8;

Fig. 10 is a section taken on line 10—10 of Fig. 6;

Fig. 11 is a perspective view of one embodiment of a work piece holder or clip constituting part of the work transfer means;

Fig. 12 is a fragmentary plan view and partial section of parts of the magazine and transfer means showing the action of the transfer means in grasping a work piece preparatory to removing it from the magazine;

Fig. 13 is a sectional view taken on line 13—13 of Fig. 12;

Fig. 14 is a view similar to Fig. 4, but drawn to the same scale as Fig. 3, showing another one of the many types of work piece which may be operated on by this machine.

Like reference characters designate the same parts wherever they occur in all the figures.

Figures 6, 7:
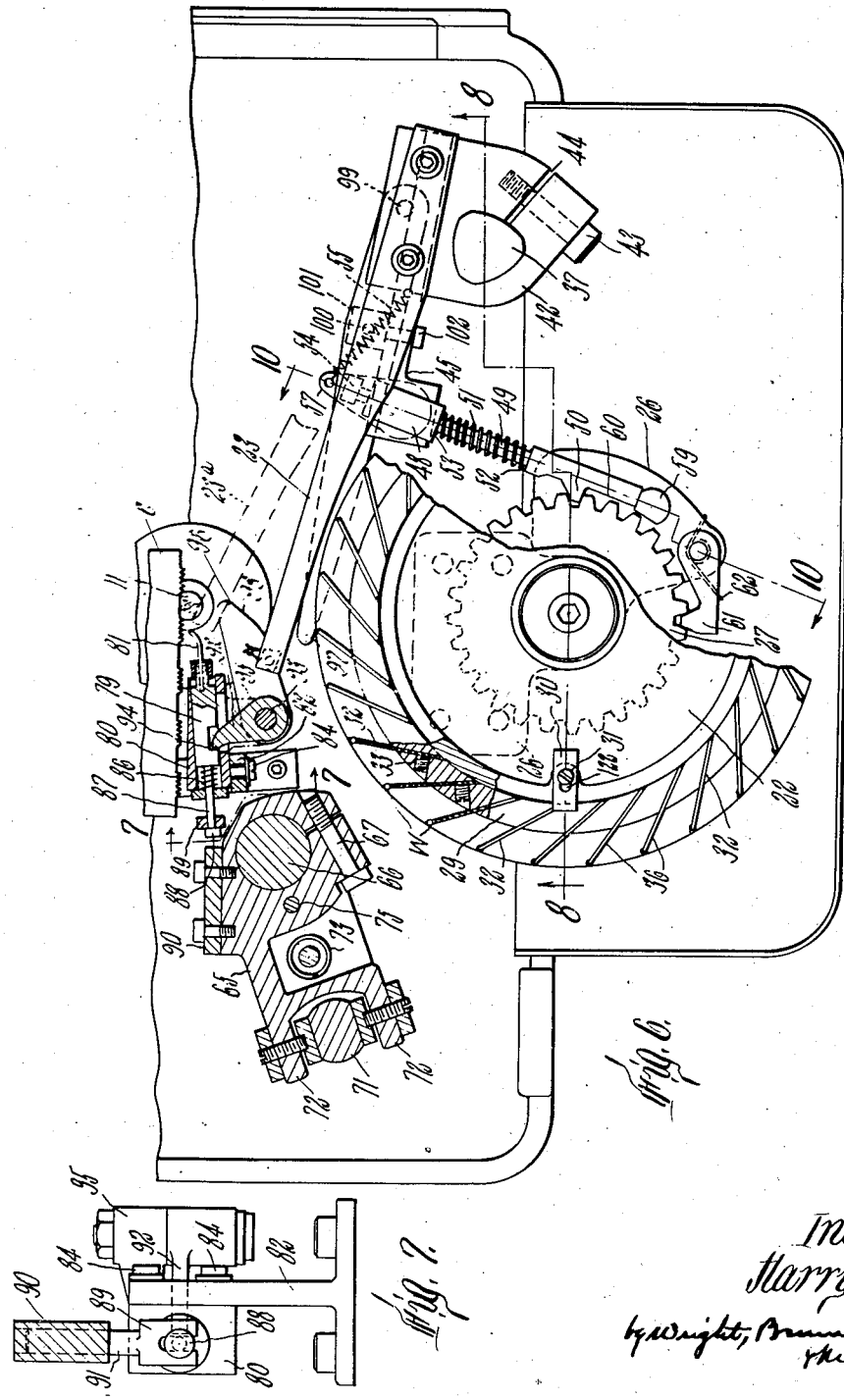
Fig. 6 is in part a horizontal section taken on line 6—6 of Fig. 3 and in part a plan view of the work piece magazine and transfer means, partially broken away, in their operative relation to the parts which are shown in section.
Fig. 7 is an elevation in part section of the parts lying to the right of line 7—7 in Fig. 6.

The gear shaping machine with which the herein illustrated embodiment of the present invention is combined, is equipped with an upright spindle 11 rotatably mounted in a suitable part of the machine base 12. Alined with the spindle above the upper end thereof is a work centering device or tail stock 13. The spindle and tail stock, with or without the aid of interchangeable adaptors of various forms or dimensions, are organized to hold firmly gear blanks of many different kinds and dimensions, so that the spindle imparts rotation to the work piece. One of such work pieces is shown at W in Figs. 2, 3, 4, 12, 13 and 14.

The machine is also equipped with a cutter C having cutting teeth arranged in a straight line like the teeth of a rack and secured to a reciprocable carrier 14 so that the pitch line of its teeth extends crosswise of the spindle axis in rectilinear relation thereto. The cutter carrier 14 is mounted on a cross slide 15, adjustable to place the cutter at the required distance from the work spindle for cutting gears of different diameters; and said cross slide is supported by a carriage 16 which is supported on the base 12 movably and is engaged with guides 17, 18 and 19, by which its movement is constrained to take place in a path parallel to the line of cutter teeth. A motor 20 (shown dotted in Fig. 1) mounted on the cross slide 15 operates the cutter, giving it a reciprocating movement transverse to its own length and in the general direction of the spindle axis. When spur gears are cut, the reciprocating motion of the cutter is parallel to said axis, and in cutting helical gears such motion is inclined to the axis.

A second motor, not shown, is mounted in the machine base 12 and imparts rotation to the work spindle 11 and linear translative movement to the carriage 16 at a speed equal to the pitch line velocity of the work piece, besides operating the novel transfer means of the present invention. The machine includes also automatic control means which, upon completion of a gear cutting cycle, cause the movements of the work spindle and cutter to be stopped, set into rotation a shaft 21 (shown in Figs. 2, 3 and 5) by which the finished work piece is released and the transfer means and blank holding magazine are operated, and cause the cutting cycle to be repeated after transfer of a blank.

The gear generating machine thus briefly summarized is disclosed in full detail in the patent of Edward W. Miller, No. 2,372,596, granted March 27, 1945, pursuant to application Serial No. 284,416, filed July 14, 1939. As the distinctive characteristics of said machine are not material to the present invention, (for this invention may be combined with machine tools of many different types, as previously stated), it is not necessary to describe or show such characteristics further in this disclosure, except as to certain features which have a special cooperation with the transfer means and are later described. It is sufficient for the present disclosure to explain that the shaft 21 is the main drive shaft of the work supplying and placing means and that it is actuated by power from any suitable source, intermittently, at times when a finished work piece is to be removed and a blank piece is to be delivered to the work holder of the machine tool.

A number of blank work pieces are held by a circular magazine 22, which is rotated step by step to bring them successively to delivering position, and are carried one by one by a transfer arm 23 from the magazine to the grasp of the spindle 11 and tail stock 13.

The magazine consists, in part, of a disk or table 24 mounted rotatably on a stud 25 which in turn is supported by a bracket 26 secured to the machine base at a location in front of the work spindle. A gear 27 is secured to the under side of disk 24 and serves as a ratchet for turning the disk step by step. Surrounding the rim of the disk and bearing against a peripheral flange 28 which projects from one edge of the rim, is a ring 29 secured detachably by two clamps 30 and holding screws 31 substantially as shown in Figs. 6 and 8. When so attached, this ring is, in effect, the peripheral or marginal part of the table. It is provided with means adapted to hold blank work pieces W, in number equal to the teeth of the gear 27, spaced equally apart at equal distances from the center of the magazine. The blank holding means last referred to may be embodied in many different forms, one being shown for illustration here. In this illustration there are separate individual blank holders 32 made of thin plates of steel or other suitable material, thinner than the diameter or width of the blank, set edgewise in slots in the ring, wherein they are secured by set screws 33. The plate is cut back from its outer end to form a seat 34 on which one end of the work piece may rest, and a shoulder 35 for engaging one side of the work piece to hold it in a prescribed position. Such seat may contain a central groove for reception of a pivot on the work piece, or one end of an arbor, when designed for holding work pieces provided with pivots or assembled with arbors, as in this illustration. Near its upper edge the plate is deeply slotted to form a spring finger 36 to press the work piece toward the seat 34, holding it with a yieldable clamping effect which is easily overcome by the transferrer.

The transfer arm 23 swings around the axis of a shaft 37, to which it is secured by means later described. It normally occupies a neutral position, as shown in Fig. 6, above the plane of the magazine, from which it swings in one direction over the magazine to the position shown in Fig. 12, and in the opposite direction to the broken line position 23a shown in Fig. 6. It carries a pair of spring fingers or jaws 38 depending from its under side in a location such that the blank grasping portion of such jaws is brought in line with the work spindle when the arm is in the extreme position indicated at 23a, and the jaws are brought to embrace one of the blank holders 32 and to grasp the blank work piece W held thereby when the arm is in the other extreme position shown in Fig. 12. To permit this latter relationship between the transfer jaws and the blank holder, the magazine is arrested after each step of its movement with one blank between the paths of the two jaws, and the holders are arranged so as to lie substantially tangential to such paths when arriving at the delivery location.

It will be noted particularly from Figs. 11 and 13 that the jaws are hung by suspension members 39 from an attaching portion 40 which is secured to the transfer arm by a bolt or rivet 41, so that they may embrace a blank holder 32 while the arm swings over such holder; and that they are otherwise so disposed as to pass along the holder without interference until their grasping portions grip the blank between them. Such grasping portions have recesses in their inner faces to receive the blank and shoulders at each side of such recesses, the corresponding shoulders of the two jaws being nearer together than the width of the blank. Other forms of blank gripper may be used with the transfer arm, as well as other forms of blank holder with the magazine, the specific character of such members being of secondary importance provided only that the holders be arranged to hold the blanks so that they may be taken by the grippers, and that the latter be suitably arranged to grasp the blanks held by the holders, and powerful enough to withdraw them from the holders.

The transfer arm 23 is made fast to a head 42, which is fitted to the upper end portion of shaft 37 and is clamped tightly thereto by a screw 43 organized to draw together the parts of the head at opposite sides of the slot 44 which runs from the outer surface of the head to the passage wherein the shaft is received. An arm 45 is secured to the side of head 42 beneath the transfer arm and is formed with a bearing 46 in which a stud 47 is rotatably mounted. Stud 47 has a guideway 48 above, and parallel with, the upper surface of bracket 26. A rod 49 passes through guideway 48, in which it is fitted to slide endwise, and is provided with a tooth 50 on one side adjacent to the gear 27. The tooth 50 is in the same plane with the gear and is adapted to enter the tooth spaces thereof, coacting therewith as a pawl with a ratchet. It is forced yieldingly in the direction for propelling the ratchet by a spring 51 which surrounds the rod 49 and is confined in a semicompressed condition between a shoulder 52 on the rod and a shoulder 53 on the stud 47 at the end of guideway 48. The rod 49 protrudes at the opposite end of guideway 48 from the pawl, having on its protruding end a collar 54 which prevents withdrawal from the guideway. The pawl is pressed toward the ratchet gear by a spring 55 which is coupled at one end by an anchor pin 56 with an arm 57, keyed to stud 47, and at the other end to an anchor stud 58 on the supporting arm 45.

These parts are so arranged that, when the shaft 37 is turned so as to withdraw the transfer arm to its rearmost position (shown at 23a in Fig. 6), the pawl is withdrawn from its engagement with a tooth of the ratchet gear (the rear side of the pawl being sufficiently oblique to slip past the contiguous gear tooth), and when returned to the neutral position, which is that shown by full lines in the drawings, the pawl is advanced by its spring 51 until the forward end of rod 49 is arrested by a stop pin or abutment 59 mounted on bracket 26. The movement thus given to the pawl is somewhat greater than the pitch spacing of the ratchet gear teeth. An arresting surface 60 on the side of the rod 49 adjacent to the gear forwardly of the pawl tooth prevents the pawl from being swung by spring 55 too far toward the line of centers of the gear and stud 47 (by bearing against the outside circumference of the gear), and insures that the next adjacent rearward tooth will be advanced by the pawl on its next forward movement. Spring 51 is further compressed, without moving the pawl, when the transfer arm is carried onward to pick off a blank work piece from the magazine. A holding pawl 61 is pivoted to the bracket 26 and is pressed by a spring 62 toward the gear so as to prevent backward movement of the gear when the driving pawl 50 is withdrawn. Spring 51 is sufficiently powerful to cause dislodgement of the holding pawl by the cam action of the gear teeth when the driving pawl is thus advanced.

Another feature of the present invention is an automatic means for dislodging finished work pieces from the work spindle preparatory to placement of an uncut blank. This displacing means is cooperatively combined with the work supplying means just described and with means for separating the tail stock or cooperative work holder from the spindle.

The tail stock 13 is secured by an arm 64 to a carrier 65 clamped on an endwise reciprocable shaft 66 by a clamp screw 67, as shown in Fig. 6. The shaft 66 is mounted slidingly in a bearing 68 in a part of the machine base adjacent to the spindle, as best shown in Fig. 3, and is elevated to withdraw the tail stock from the spindle by a cam 69 on shaft 21 acting through a lever 70. The carrier 65 is guided, so as to maintain alinement of the tail stock with the spindle, by a fixed post 71 which is embraced by webs 72 of the carrier. This mechanism is substantially the same as means for operating the work clamp shown in the beforementioned Miller Patent 2,372,596, except that it includes in addition a spring 73 reacting between the carrier and an adjustable fixed abutment 74 for moving the carrier oppositely to the movement imparted by the cam; and an adjustable stop pin 75 for limiting the spring-impelled movement of the carrier and establishing a prescribed minimum distance between the tail stock and the spindle.

The machine is also provided with an ejector 76, such as is shown in said patent, mounted for movement endwise in the axis of the spindle and so moved by a lever 77 and a cam 78 on shaft 21. The ejector serves for clearing from the spindle work pieces which have pivot or shaft extensions, or are mounted on arbors, which project into the spindle or into an adaptor carried thereby.

The work dislodging means, conveniently called a "kickoff," consists of a plunger 79 mounted for endwise sliding movement in a guide 80 and having a protruding finger 81. Said guide is supported by a pedestal 82 mounted in fixed position on a flange 83 which projects from the bearing sleeve 68 and is in effect a part of the machine base structure. The arrangement of the pedestal, guide and plunger is such that the finger 81 projects toward the spindle axis and its extremity is movable in a path substantially perpendicular to such axis through a range permitting its withdrawal to a position clear of the largest work pieces capable of being operated on by the machine, and advancement toward such axis far enough to strike the side of a work piece of the smallest diameter. The guide is connected adjustably to the pedestal 82 by screws 84 contained in a slot 85 in the pedestal which extends generally parallel to the spindle axis so that the kickoff finger may be adjusted for work pieces of different lengths.

The plunger 79 is urged toward the work spindle axis by a spring 86, reacting between a shoulder on the plunger and an abutment in the guide, and has an extension 87 passing outwardly from said abutment, on the extremity of which is a collar or head 88 forming an abutment for a cocking lock 89. Said lock is a fork, the legs of which are adapted to straddle the plunger extension 87 and are separated by a space narrower than the width of the head 88. This fork is connected to the tail stock carrier 65 by a bracket 90 secured to the side of the carrier and having a socket in which the shank 91 of the fork is secured. When the tail stock carrier and tail stock are in the work holding position, and the kickoff plunger is retracted, the fork 89 embraces the plunger extension and retains it in the retracted position; but when the carrier is moved to withdraw the tail stock, the fork is moved clear of the abutment head 88 and the plunger is advanced by its spring 86 to knock the released work piece away from the spindle and out of the path of the blank piece which is then being carried to the spindle by the transfer arm.

The plunger is retracted or cocked by an arm 92 secured to a rock shaft 93 and projecting therefrom through the side of the guide 80 into a notch 94 in the side of the plunger. Shaft 93 is rotatably mounted in a bracket 95 on the side of the guide 80, and carries a second arm 96 projecting obliquely into the path of the extremity of an arm 97, which is connected to the head 42 and extends therefrom in the same general direction as the transfer arm 23 and has similar angular movements. Its extremity is arranged to engage the side face 98 of arm 96 before the blank carried by the transfer arm is brought in line with the work spindle axis, whereby to retract the kickoff finger clear of the blank gripper; and the arms 97, 98 and 92 are further so related that, when the transfer arm reaches its extreme rearward movement, arm 97 has caused the kickoff plunger to be fully withdrawn and its extension brought to the location where it will be embraced by the fork 89 when the latter next descends.

Arm 97 is coupled to the head 42 by two studs 99 and 100, one of which depends from an overhanging shoulder of the head 42 and the other of which rises from a block 101 secured to the side of arm 45 by a screw 102.

Angular movements are imparted to shaft 37 and are synchronized with the movements of the tail stock 13 and ejector 76, by the mechanism shown in Figs. 2 and 5. Shaft 21 carries a bevel gear 103 meshing with a bevel gear 104 on a shaft 105. A cam 106 is secured to shaft 105 and engages a follower roll 107 carried by the extremity of an arm 108 which is keyed to the lower end of shaft 37. A spring 109 is connected with arm 108 to cause it to follow receding surfaces of the cam. An adjustable stop 110 is mounted on the machine base adjacent to a stop arm 111 carried by the shaft 37 to limit the spring impelled movements of shaft 37 (which cause the transfer arm to be moved toward the work spindle axis), so as to stop the transfer arm when the work blank which it carries is exactly alined with the spindle axis.

Shaft 21 is controlled by automatic means, as explained in said Miller Patent 2,372,596, to rotate through a single complete revolution at the end of each work cutting action of the machine, and then stop. The cams 69, 78 and 106 have contours suitably formed and angularly related to one another to cause movement of the transfer arm from the neutral position shown in all the drawings except Fig. 12, to the blank taking position shown in Fig. 12, and then toward the spindle axis. While these movements take place, the tail stock carrier is raised, releasing the finished work piece, the ejector 76 is raised to clear an inserted work piece shaft or arbor from the spindle, and the kickoff is thereupon immediately released and advanced by its spring to knock the finished work piece into a suitably located receptacle, such as that shown at 112. These actions take place before the cocking arm 97, in its approach toward the spindle, has reached the point of first engagement with arm 96. Thereafter the transfer arm carries the work blank to the spindle, the cocking arm 97 cocks the kickoff, and while it holds the latter in cocked position, the tail stock carrier descends to lock the kickoff and bring the tail stock into engaging relation with the work piece which is held by the transfer arm. The final part of the rotation of cam 106 returns the transfer arm to neutral position and operates pawl 50 to turn the magazine through one step, bringing a loaded blank holder into the place of the one from which a blank has just been removed.

Two of the many different types of work piece which may be handled with this apparatus are shown in Figs. 3, 4 and 14. That shown in Fig. 3, with an enlargement in Fig. 4, has integral pivots or shaft entensions 113. That shown in Fig. 14 consists of a series of disks mounted on an arbor 114. The spindle and tail stock are provided with interchangeable adapters 115, 116, 115a, 116a, etc., of which the forms and dimensions are suited to the various work pieces. The adapter carried by the tail stock is preferably slidably mounted therein, under outward pressure by a spring 117 and limited as to its outward movement by a key 118 extending into an encircling groove in the adapter; and is provided with an internal ejector 119 pressed upon by a spring 120 less strong than the spring 117. The springs press oppositely on a common abutment or spring seat 121, which is removable from the interior of the adapter.

The construction of the magazine as previously described, which includes a detachable outer ring 29, enables the magazine to be changed over quickly for accommodating different work pieces. The clamps 30 are retractable upon loosening their holding screws 31, by virtue of slots 122 in the clamps through which the screws pass. The ring 29 may be lifted off and a similar ring, equipped with work holders designed for different blank work pieces, may be substituted on the body disk. It is possible also to load the rings apart from the magazine body and substitute loaded magazines for exhausted ones, although it is generally preferable to place blanks in empty blank holders without removing the ring.

What I claim and desire to secure by Letters Patent is:

1. The combination with a machine tool having a rotatable work spindle, a tail stock movable cooperatively with respect to said spindle for grasping and releasing work pieces, a cutter, and mechanism for operating said spindle, tail stock and cutter to perform a cycle of work grasping, cutting, and work releasing actions; of a rotatable magazine having holders for blank work pieces spaced equidistant from the axis of the magazine and at equal distances from each other in the plane of rotation, a transfer arm having a work gripper and being mounted for angular movement in a location to shift said gripper from work grasping relation with one of the blanks on the magazine to delivering position between the work spindle and tail stock, and correlated mechanism operable to turn the magazine step by step and move the transfer arm in timed relation with the movements of the magazine and the movements of the tail stock.

2. A mechanism for supplying work piece blanks to a machine tool comprising a transfer arm having a gripper adapted to receive, carry and deliver a blank work piece, holding means for said arm operable to move said gripper from a receiving position to a delivering position, a magazine having means for holding a plurality of blank work pieces spaced apart from one another, and being movable to bring the blanks so held successively into said receiving position, the holding means of the magazine for each work piece being constructed to engage the piece graspingly at opposite ends of the piece, and the gripper of the transfer arm being constructed and disposed to engage opposite sides of the work piece between the ends thereof, and mechanism for so moving the magazine correlated with the means for shifting the transfer arm so as to hold the magazine stationary when the gripper is in and near the receiving position, and to advance the magazine when the gripper is away from said position.

3. A work supplying mechanism for machine tools comprising a rotatably mounted blank-holding magazine, an oscillatively mounted transfer arm having a blank-gripper movable toward and away from the magazine, a pawl and ratchet mechanism operatively associated with said transfer arm and magazine for turning the magazine intermittently in the course of movements of the arm in one direction, the magazine having blank holders disposed around the axis of the magazine with angular spacing equal to the spacing between the steps of the ratchet, one of said holders being in the path of the gripper whenever the magazine is at rest.

4. A work blank supplying means for machine tools comprising a rotatable magazine having an attached coaxial ratchet gear, an oscillatively mounted arm having a blank gripper at a distance from its axis of oscillation, a pawl associated with said arm for movement by and with the same and engageable with successive teeth of said ratchet in the course of successive movements of the arm in one direction, and work blank holders on the magazine spaced apart for carrying blank work pieces successively to a given position with successive steps of the ratchets; said transfer arm and its gripper being arranged to approach and grasp the blank in said position and carry the blank away therefrom.

5. A work blank supplying means for machine tools comprising a rotatably mounted magazine having an attached coaxial ratchet gear and blank holding means arranged to support blank work pieces adjacent the circumference of the magazine with an angular separation equal to the angular pitch of the ratchet gear teeth, a transfer arm having a blank gripper, means for swinging said arm to carry the gripper into blank-receiving relation to the blank carrying zone of the magazine and away therefrom, a pawl cooperatively engaged with said ratchet and arm for imparting steps of rotation to the ratchet while said gripper approaches the magazine, a spring acting between the arm and pawl to propel the pawl in the ratchet driving direction, and stop means arranged to limit advancing movement of the ratchet, said spring being adapted to yield, permitting continued movement of the arm after stoppage of the magazine.

6. The combination with a machine tool having cooperative members for holding a work piece, one of which members is movable toward and away from the other for grasping and releasing the piece, of a magazine for holding a supply of blank work pieces, transfer means for carrying blank work pieces from said magazine to said work holding members, a kickoff device arranged for movement toward and away from the location of a work piece held by said members, a spring acting on said device tending to advance the same toward said location, kickoff retracting means operable by the transfer means, and a lock for holding the kickoff device in retracted position.

7. The combination with a machine tool having cooperative members for holding a work piece, one of which members is movable toward and away from the other for grasping and releasing the piece, of a magazine for holding a supply of blank work pieces, transfer means for carrying blank work pieces from said magazine to said work holding members, a kickoff device arranged for movement toward and away from the location of a work piece held by said members, a spring acting on said device tending to advance the same toward said location, kickoff retracting means associated with said transfer means and operable during approach of the transfer means toward the work holding means of the machine tool for retracting the kickoff device, and a kickoff lock connected with that one of the work holding members of the machine tool which is movable toward and away from the other member arranged to lock the kickoff device in retracted position when said movable member is in its work holding position, and to release the kickoff when said member is moved away from such position.

8. In a machine tool, the combination with a work spindle, of a tail stock cooperating with the spindle for holding work pieces in position to be machined, a tail stock carrier movable to bring the tail stock into and out of work holding position, a kickoff device mounted adjacent to the spindle and movable to bring an extremity thereof up to and away from the operating location of a work piece between the spindle and tail stock, a spring tending to advance the kickoff device toward said location, and a kickoff lock connected with the tail stock carrier arranged to interlock with the kickoff device when the latter is retracted from such work piece location and the tail stock is in work holding position, and to release said device when the tail stock is withdrawn from such position.

9. In combination with a machine tool, a magazine adapted to hold blank work pieces to be operated on by said machine, a transferrer movable toward and away from the magazine for picking off blanks therefrom and carrying them to the machine, a work piece kickoff movably mounted in position to advance and expel finished work pieces and to be retracted, means associated with said transferrer for placing said kickoff in retracted position as the transferrer moves away from the magazine, a lock for holding the kickoff retracted and potentially active means tending to advance the kickoff and operative to that effect when said lock is released.

10. Work feeding means for machine tools comprising a rotatably mounted magazine having a series of blank work piece holders arranged to hold work piece blanks in circular series spaced apart from one another adjacent to the circumference of the magazine, a shaft mounted to oscillate about an axis substantially parallel to the axis of the magazine, a transfer arm carried by said shaft and extending therefrom in a generally tangential relation to the magazine, a blank gripper carried by said arm at a distance from the shaft and located to move, with oscillations of the shaft in a path lying between a point on the circumference of the magazine and a point separated from the magazine, and means correlated with oscillations of the arm to rotate the magazine step by step, said magazine rotating means being correlated with the blank holding means thereof to place one of such blank holding means in the path of the gripper at the end of each step of rotation of the magazine.

11. In a work feeding means of the character hereinbefore set forth, a magazine consisting of a table and work holding plates set edgewise in the marginal part of the table and projecting outwardly therefrom in spaced-apart relation; said plates having means for supporting and grasping work pieces.

12. In a work feeding means, a magazine consisting of a table and a series of work piece holders projecting in spaced-apart relation from the marginal part of the table; each of said holders having a seat for a work piece and a retainer opposite to said seat resiliently disposed to exert pressure against a work piece located between it and the seat.

13. In a work feeding means of the character hereinbefore set forth, a magazine consisting of a table and work holding plates set edgewise in the marginal part of the table and projecting outwardly therefrom in spaced-apart relation; said plates being recessed at their outer end to form a seat and a backing shoulder for a work piece, and having a spring finger arranged to press on a work piece located against said seat and shoulder.

14. A magazine for a work feeding apparatus, consisting of a disk having spaced-apart slots in its peripheral part and plates set edgewise in said slots and projecting outwardly therefrom, said plates being recessed in their outer ends to provide a seat and a spring finger disposed to receive a work piece between them and make gripping engagement with the opposite extremities of the work piece.

15. A magazine for a work feeding apparatus, consisting of a disk, a ring surrounding the rim of the disk and secured detachably thereto, the ring having slots entering its outer face in locations spaced about its axis, and work holders set into said slots and projecting outwardly therefrom, recessed in their outer ends to provide grasping portions to receive work pieces between them and bear on the extremities of the work pieces.

HARRY KING.